United States Patent
Sugiyama

(10) Patent No.: US 9,244,230 B2
(45) Date of Patent: Jan. 26, 2016

(54) OPTICAL TRANSMITTER AND INTERCONNECTING CIRCUIT BOARD

(75) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 627 days.

(21) Appl. No.: 13/232,511

(22) Filed: Sep. 14, 2011

(65) Prior Publication Data

US 2012/0114340 A1    May 10, 2012

(30) Foreign Application Priority Data

Nov. 10, 2010   (JP) .................................. 2010-252362

(51) Int. Cl.
*H01P 5/08* (2006.01)
*H01P 3/08* (2006.01)
*G02B 6/42* (2006.01)

(52) U.S. Cl.
CPC ................ *G02B 6/4201* (2013.01); *H01P 3/08* (2013.01); *H01P 5/08* (2013.01)

(58) Field of Classification Search
CPC ......................................................... H01P 3/08
USPC ........................ 333/33, 238, 246, 260; 385/88
See application file for complete search history.

(56) References Cited

U.S. PATENT DOCUMENTS

| 4,991,001 A * | 2/1991 | Takubo et al. ................. 257/668 |
| 7,193,490 B2 | 3/2007 | Shimoda |
| 2010/0215324 A1 | 8/2010 | Ban |

FOREIGN PATENT DOCUMENTS

| JP | 2004-320109 A | 11/2004 |
| JP | 2010-191346 | 9/2010 |

* cited by examiner

*Primary Examiner* — Stephen E Jones
(74) *Attorney, Agent, or Firm* — Staas & Halsey LLP

(57) ABSTRACT

An optical transmitter including: an optical module; an interconnecting circuit board configured to be electrically coupled to the optical module; and a printed circuit board configured to be electrically coupled to the interconnecting circuit board; wherein the interconnecting circuit board includes: a coplanar waveguide; and a microstrip line including a signal wiring line extended from an end of the coplanar waveguide and a ground wiring line, wherein the width of the signal wiring line is narrower than the width of a signal wiring line of the coplanar waveguide, and the spacing between the signal wiring line extended from the end of the coplanar waveguide and the ground wiring line is smaller than the spacing between the signal wiring line of the coplanar waveguide and the ground wiring line.

7 Claims, 19 Drawing Sheets

Background

Background

Background

OPTICAL TRANSMITTER AND INTERCONNECTING CIRCUIT BOARD

CROSS REFERENCE TO RELATED APPLICATION

This application is based upon and claims the benefit of priority from the prior Japanese Patent Application NO. 2010-252362 filed on Nov. 10, 2010, the entire contents of which are incorporated herein by reference.

FIELD

The embodiments discussed herein are related to an interconnecting circuit board and an optical transmitter.

BACKGROUND

Optical transmission systems use optical modulators. Examples of known optical modulators include phase-modulation optical modulators using electro-optic crystals such as $LiNbO_3$ (lithium niobate: LN) or $LiTaO_2$ (lithium tantalite). When such an optical modulator is modularized and installed in an optical transmitter, an optical device such as an optical module, for example, is mounted to the printed circuit board (PCB) of the optical transmitter using surface mounting technology. When the optical device is mounted to the PCB using surface mounting technology, an interconnecting circuit board such as a flexible printed circuit (FPC) is used to electrically connect the optical device to the PCB.

Referring to FIGS. 17 to 19, surface mounting of an optical module will be described. FIG. 17 is a cross-sectional view of connection sections of a PCB and an FPC viewed from a side, FIG. 18 is a diagram illustrating the connection surface of the PCB to be coupled to the FPC, and FIG. 19 is a diagram illustrating the connection surface of the FPC to be coupled to the PCB. For convenience of explanation, the connection surface of the FPC 300 to be coupled to the PCB 400 is referred to as the "bottom surface" and the opposite surface is referred to as the "top surface". The connection surface of the PCB 400 to be coupled to the FPC 300 is referred to as the "top surface" and the opposite surface is referred to as the "bottom surface".

As illustrated in FIG. 17, electrodes of the FPC 300 and electrodes of the PCB 400 are conductively interconnected through solder 500. On the connection surface of the PCB 400, CoPlanar Waveguides (CPW) 410 including electrode pads for ground wiring lines $400G_1$ and $400G_2$ and an electrode pad for a signal wiring line 400S are formed as illustrated in FIG. 18. Similarly, coplanar waveguides CPW 310 including electrode pads for ground wiring lines $300G_1$ and $300G_2$ and an electrode pad for a signal wiring line 300S are formed on the connection surface of the FPC 300 as illustrated in FIG. 19. The signal wiring line of the FPC 300 changes its structure at the end of the CPW to a MicroStrip Line (MSL) 320. The CPW 410 of the PCB 400 and the CPW 310 of the FPC 300 are coupled together by soldering.

The width of the strip of the signal wiring line is designed so that the impedance of the electrodes of the MSL 320, among the electrodes formed on the connection surface of the FPC 300, is equal to a design value, for example 50Ω. The electrodes of the CPW 310 of the FPC 300 are formed as electrode pads in order to widen the area of contact of the signal wiring line 300S, the ground wiring lines $300G_1$ and $300G_2$ with solder. Through-holes for checking the quality of solder joint (wetness) are provided in the electrode pads of the signal wiring line 300S and the ground wiring lines $300G_1$ and $300G_2$. Solder, if present between a through-hole and the PCB, flows into the through-hole due to capillary action. The quality of the solder joint may be inspected by visually checking the through-holes formed in the top surface of the FPC 300 opposite from the bottom surface, which is the connection surface.

When the FPC 300 is soldered to the PCB 400, a solder bridge may be formed between the signal wiring line 300S and the ground wiring line $300G_1$ or $300G_2$ to cause the so-called short circuit if the spacing between the electrode pad of the signal wiring line 300S and the electrode pad of the ground wiring line $300G_1$ or $300G_2$ is too small. Therefore, in the CPW 310 of the FPC 300, the electrode pads are disposed at such a distance s1 apart from one another that the possibility of formation of a solder bridge is reduced.

While one end of the FPC that is coupled to the PCB is illustrated in FIGS. 17 to 19, the other end of the FPC is coupled to the tips of lead pins attached through the external wall of a package of the optical module. The lead pins may be attached to a sidewall of the package or near the bottom of the package.

Unfortunately, the conventional technique described above has a problem that electrical signal reflection characteristics at the electrical connections between the printed circuit board and the interconnecting circuit board degrade as described below.

[Patent document] Japanese Laid-Open Patent Publication No. 2004-320109

The interconnecting circuit board described above is intended to be used merely for surface-mounting an optical module for low-frequency application. A wide spacing is provided between electrode pads of a signal wiring line S and a ground wiring line G because a higher priority is given to the ease of surface mounting of the optical module than electrical signal reflection characteristics. The wide spacing between the electrode pads of the signal wiring line S and the ground wiring line G reduces the possibility of occurrence of a solder bridge but increases the impedance to a value higher than a design value. As a result, in an optical module for high-frequency application, impedance mismatches may occur and the electrical signal reflection characteristics at the electrical connection between the printed circuit board and the interconnecting circuit board degrade.

SUMMARY

According to one aspect of the embodiments, there is provided an optical transmitter. The optical transmitter includes an optical module, an interconnecting circuit board configured to be electrically coupled to the optical module, and a printed circuit board configured to be electrically coupled to the interconnecting circuit board. The interconnecting circuit board includes a coplanar waveguide and a microstrip line including a signal wiring line extended from an end of the coplanar waveguide and a ground wiring line. The width of the signal wiring line is narrower than the width of a signal wiring line of the coplanar waveguide and the spacing between the signal wiring line extended from the end of the coplanar waveguide and the ground wiring line is smaller than the spacing between the signal wiring line of the coplanar waveguide and the ground wiring line.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

Embodiments of an interconnecting circuit board and an optical transmitter disclosed herein will be described below in detail with reference to drawings. The embodiments are not intended to limit the technique disclosed. Any of the embodiments may be combined as appropriate, provided that no contradiction in processing arises.

Figure 1:
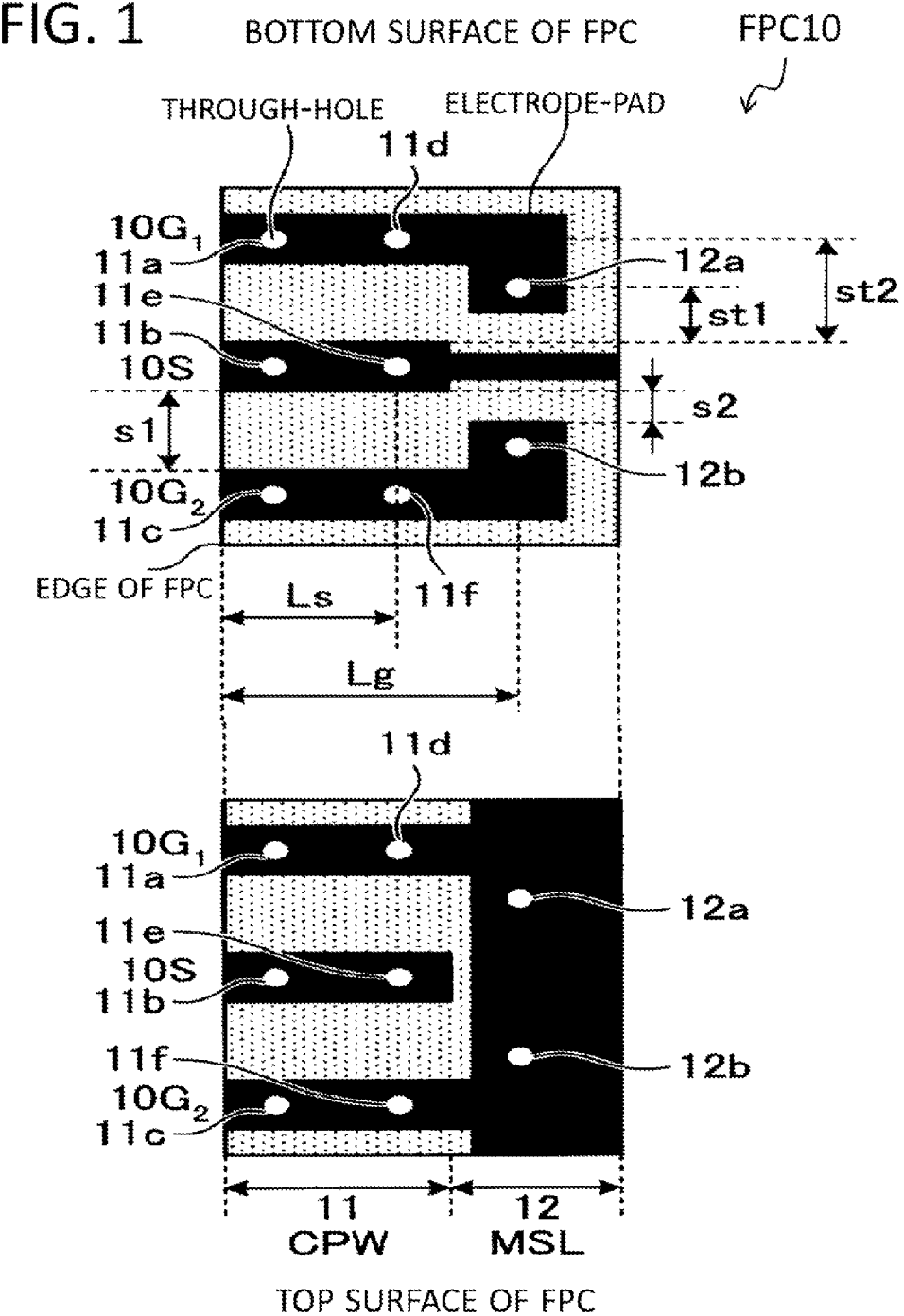
FIG. 1 is a diagram illustrating exemplary flexible printed circuits (FPC) according to an embodiment.

FIG. 1 illustrates an example of flexible printed circuits according to an embodiment. The flexible printed circuits (FPC) 10 illustrated in FIG. 1 are used for surface-mounting an optical module to a printed circuit board (PCB) of an optical transmitter. For convenience of explanation, the connection surface of the FPC 10 to be coupled to the PCB is referred to as the "bottom surface" and the opposite surface is referred to as the "top surface". The connection surface of the PCB to be coupled with the FPC 10 is referred to as the "top surface" and the opposite surface is referred to as the "bottom surface".

As illustrated in FIG. 1, CoPlanar Waveguides (CPW) 11 and a MicroStrip Line (MSL) 12 are formed on the bottom surface of the FPC 10. The CPW 11 of the FPC 10 are soldered to CPW of a PCB, not depicted, to conductively connect the optical module to the PCB of the optical transmitter. While only the end of the FPC 10 to be coupled to the PCB is illustrated, the other end of the FPC 10 is coupled to the tips of lead pins attached through the external wall of the package of the optical module. The lead pins may be attached to a side surface of the package or near the bottom of the package.

In the FPC 10 of the present embodiment, the CPW 11 are formed on the back surface to be coupled to the PCB over a predetermined length from one of the ends of the FPC 10 that is to be conductively coupled to the optical transmitter. In the FPC 10 of the present embodiment, the MSL 12 is formed in such a manner that the width of a signal wiring line 10S extended from an end of the CPW 11 toward the other end is narrower than the width of a signal wiring line 10S of the CPW 11. Furthermore, in the FPC 10 according to the present embodiment, the MLS 12 is formed in such a manner that the spacing s2 between the signal wiring line 10S extended from the end of the CPW 11 and a ground wiring line $10G_1$ or $10G_2$ is smaller than the spacing s1 between the signal wiring line 10S of the CPW 11 and the ground wiring line $10G_1$ or $10G_2$.

The purpose of making the spacing between the signal wiring line 10S and the ground wiring line $10G_1$ or $10G_2$ in the MSL 12 at the boundary with the CPW 11 smaller in this way is to improve reflection characteristics by reducing the impedance of the bottleneck section.

The inventor has studied the cause of the increase in reflection of electrical signals at electrical connections between a PCB and FPC. The inventor divided a connection section of the FPC and PCB into three, a CPW portion, an MSL portion, and a boundary portion between CPW and MSL according to the cross-sectional profile of the connection section and calculated the impedance of each portion to identify the portion where the impedance could differ from a design value, for example 50Ω.

As a result, the inventor found that the impedance of the boundary portion between the CPW and MSL was greater than 50Ω. That is, if the impedance of the CPW portion is not 50Ω when FPC is not coupled to the PCB, the CPW portion may be caused to have an impedance of 50Ω by appropriately designing the PCB. Also, the MSL portion may be caused to have an impedance of 50Ω by setting the strip width of the signal wiring line S appropriately according to the thickness of the circuit board. In the boundary portion of the CPW and MSL, on the other hand, there is a section where the CPW is locally dominating and the impedance of that section depends on the spacing between the signal wiring line S and the ground wiring line G. For example, a simulation in which the spacing between the signal wiring line S and the ground wiring line G was set to a design value for surface mounting, 500 μm, showed an impedance of as large as 71Ω in that section. The difference in impedance from the design value may be the cause of degradation of the reflection characteristics.

Figure 2:
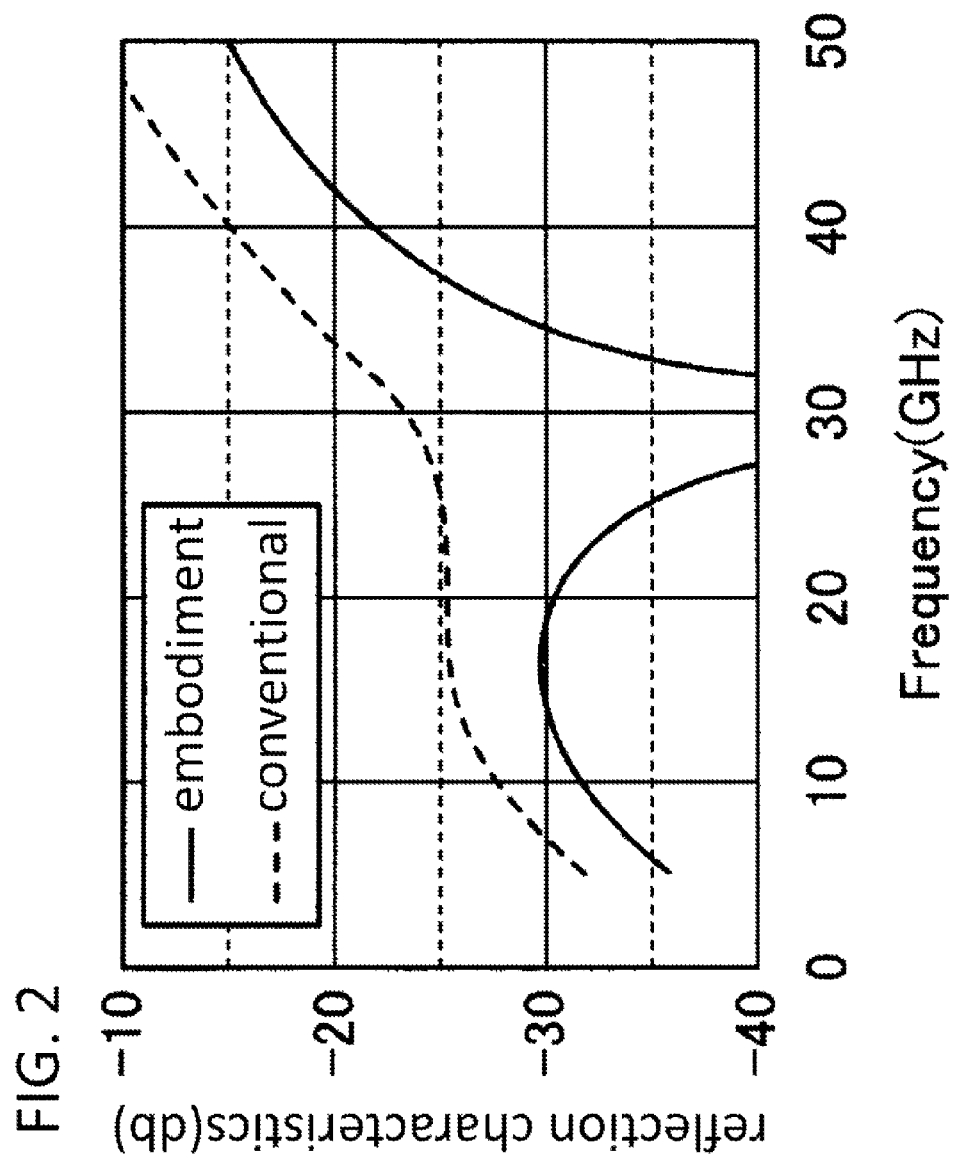
FIG. 2 is a graph of the relationship between frequency and reflection characteristics.

FIG. 2 is a graph of the relationship between frequency and reflection characteristics. The horizontal axis of the graph in FIG. 2 represents frequency in gigahertz (GHz). The vertical axis of the graph in FIG. 2 represents reflection characteristics in decibels (dB). The reflection characteristics may be calculated for example as: $10 \times \log_{10} \times$ (reflected signal power/input signal power).

In the conventional technique described above, the impedance deviates from 50Ω to 71Ω because of the 500-μm spacing between the signal wiring line S and the ground wiring line G. Consequently, as may be seen from FIG. 2, reflection characteristics values at most of the frequencies in the range of 0 to 30 GHz, which are currently used in practice, exceed −30 dB with the conventional technique. In the present embodiment, in contrast, the impedance may be made close to 50Ω by reducing the spacing between the signal wiring line S and the ground wiring line G in the MSL 12 at the boundary with the CPW 11 below 500 μm. Consequently, with the present embodiment, reflection characteristics values not over −30 dB may be achieved at frequencies in the range of 0 GHz to 30 GHz currently used in practice and reflection characteristics values lower than those achieved with the conventional technique may be achieved in all frequency bands. Thus, it may be seen that reflections may be reduced by reducing the spacing between the signal wiring line S and the ground wiring line G at the boundary between the CPW and MSL to s2 even though the spacing between the signal wiring line S and the ground wiring line G is wide, s1, in the CPW portion.

Thus, since the spacing between the signal wiring line 10S and the ground wiring line $10G_1$ or $10G_2$ at the boundary between the CPW 11 and the MSL 12 in the FPC 10 of the present embodiment is small, impedance mismatch may be avoided and the electrical signal reflection characteristics at the electrical connection between the PCB and the FPC may be improved. Furthermore, in the FPC 10 according to the present embodiment, the spacing between the signal wiring line 10S and the ground wiring line $10G_1$ or $10G_2$ in the CPW 11 does not need to be changed from a design value for surface mounting and the ease of mounting such as solder mounting may be maintained.

Through-holes are formed in the electrode pads of the ground wiring lines $10G_1$ and $10G_2$ of the MSL 12 in the FPC 10 according to the present embodiment. For example, through-holes 12a and 12b are formed in the electrode pads of the ground wiring lines $10G_1$ and $10G_2$ of the MSL 12 in addition to six through-holes 11a to 11f formed in the electrode pads of the CPW 11, as illustrated in FIG. 1. Through the additional through-holes 12A and 12b, the quality of the solder joint in the smaller spacing between the signal wiring line 10S and the ground wiring line $10G_1$ or $10G_2$ may be checked by visual inspection of the surface of the FPC 10.

To facilitate inspection of the quality of the solder joints, the through-holes 12a and 12b are preferably formed near the ends of the electrode pads of the ground wiring lines $10G_1$ and $10G_2$. In one example, the through-holes 12a and 12b are formed so that the distance st1 between the through-holes 12a and 12b and the electrode pad of the signal wiring line 10S is shorter than the distance st2 between a through-hole 11a, 11c, 11d or 11f formed in the electrode pad of the ground wiring line $10G_1$ or $10G_2$ of the CPW 11 and the electrode pad of the signal wiring line 10S. In another example, the through-holes 12a and 12b are formed so that the distance Lg between the FPC end and the through-hole 12a and 12b farthest from the FPC end among the through-holes of the ground wiring line $10G_1$ or $10G_2$ is greater than the distance Ls between the FPC end and the through hole 11e farthest from the FPC end among the through-holes of the signal wiring line 10S. In yet another example, more through-holes are formed in the ground wiring line $10G_1$ or $10G_2$ than the through holes of the signal wiring line 10S.

While the electrode pads of the ground wiring lines $10G_1$ and $10G_2$ are extended from the end of the CPW 11 in the shape of the letter L in the exemplary FPC 10 illustrated in FIG. 1, the disclosure is not limited to this. In a first variation described below, a ground wiring line G is extended in different shapes than the shape of the letter L.

Figure 3:
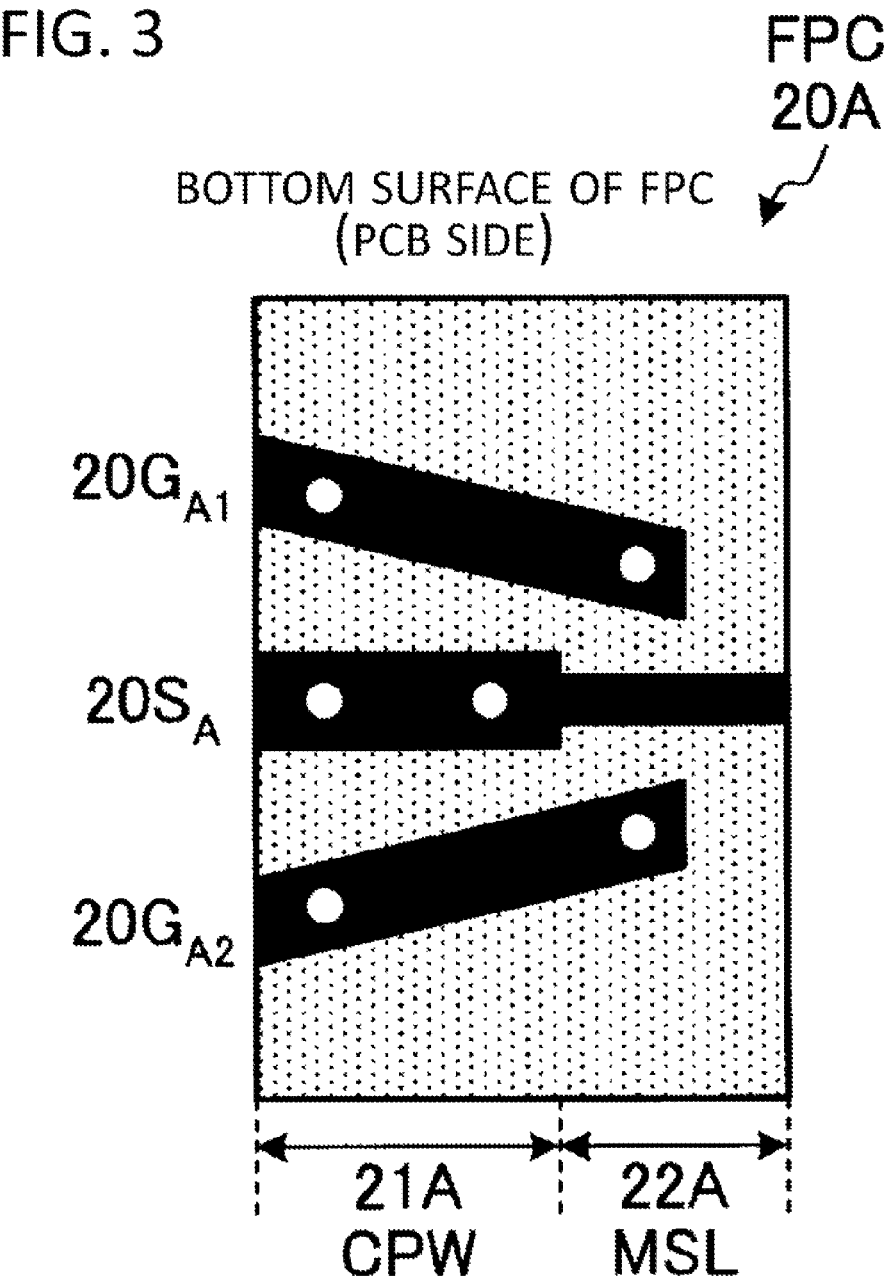
FIG. 3 is a diagram illustrating exemplary FPC according to a first variation.
Figure 4:
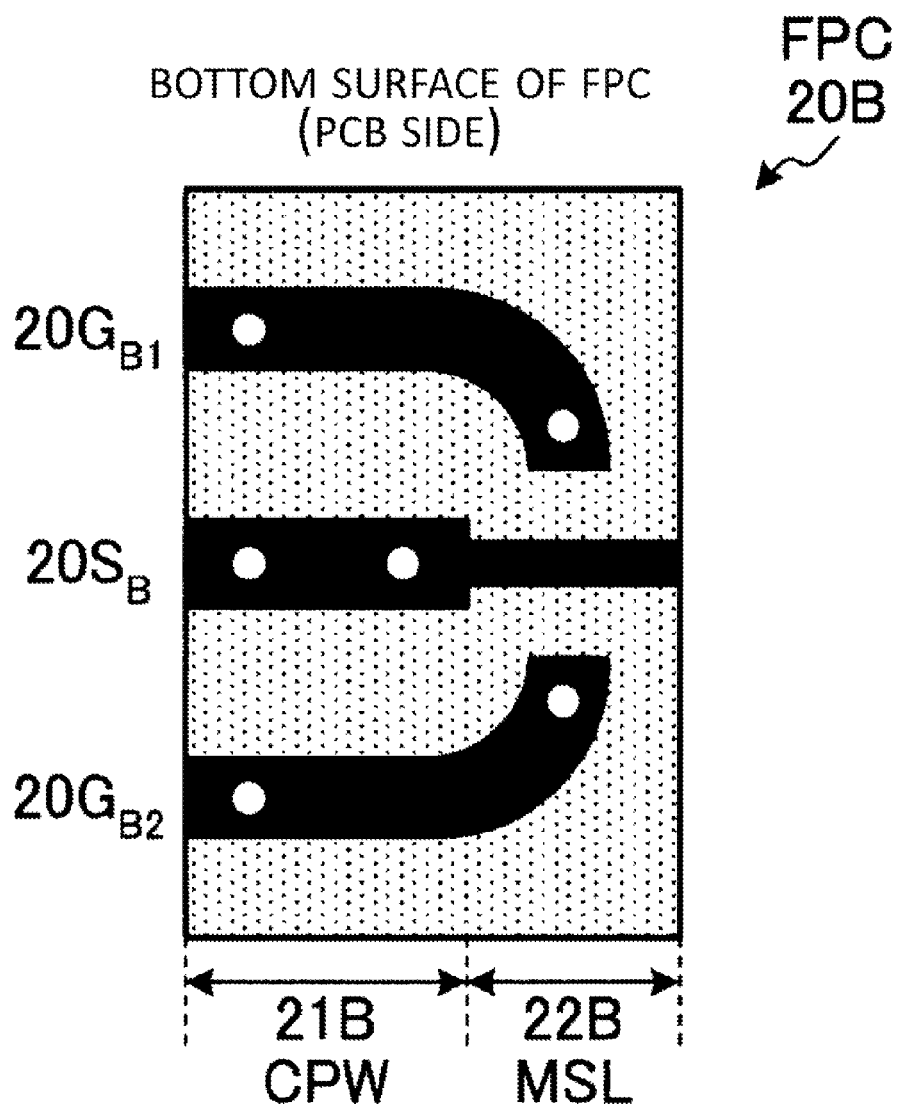
FIG. 4 is a diagram illustrating exemplary FPC according to the first variation.
Figure 5:
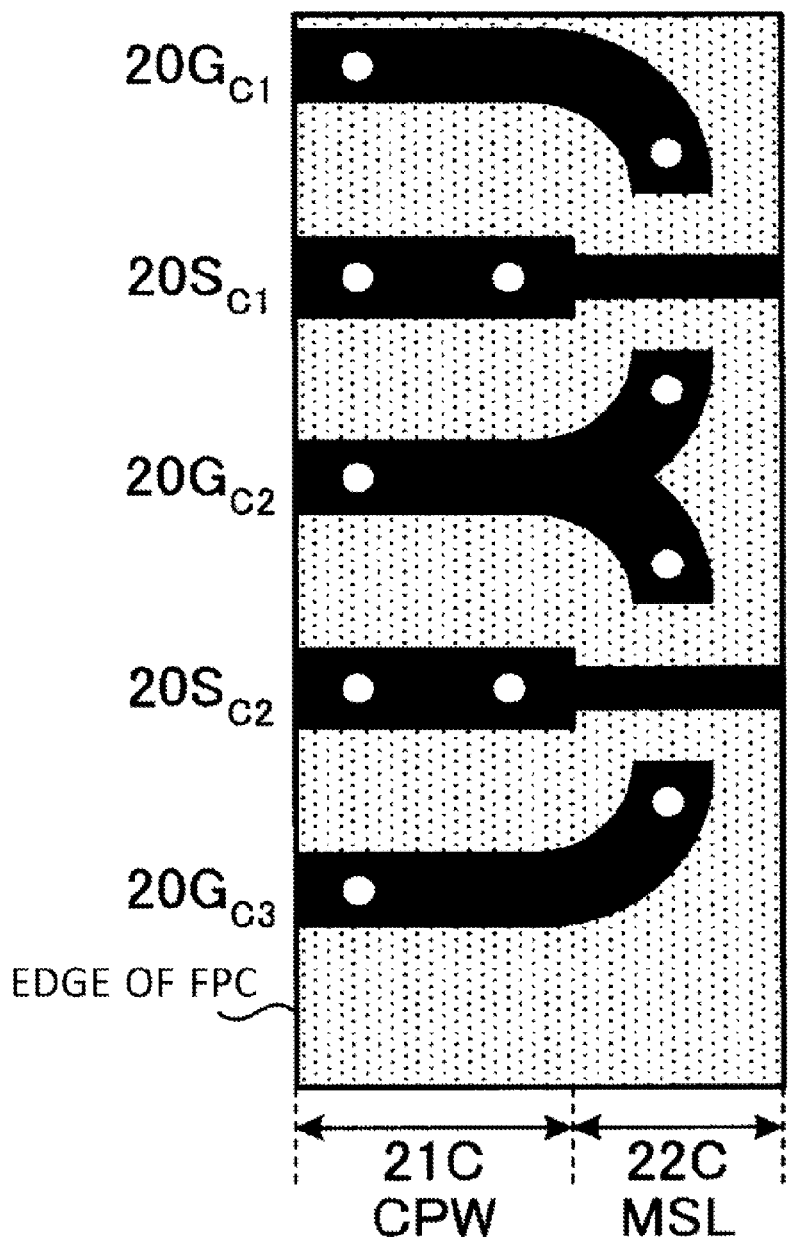
FIG. 5 is a diagram illustrating exemplary FPC according to the first variation.

FIGS. 3 to 5 illustrate examples of FPC according to a first variation. In the exemplary FPC 20A illustrated in FIG. 3, electrode pads of ground wiring lines $20G_{A1}$ and $20G_{A2}$ are arranged not in parallel to the electrode pad of a signal wiring line $20S_A$ but at an angle to the signal wiring line $20S_A$ in such a manner that the electrode pads of the ground wiring lines $20G_{A1}$ and $20G_{A2}$ approach the signal wiring line $20S_A$ with the increasing distance from the FPC end. In the exemplary FPC 20B illustrated in FIG. 4, electrode pads of ground wiring lines $20G_{B1}$ and $20G_{B2}$ are arranged in parallel to the electrode pad of the a signal wiring line $20S_B$ to the end of a CPW $21_B$, that is, the position at which the width of the signal wiring line $20S_B$ changes. Beyond the end of the CPW 21B, the electrode pads are curved so as to approach the signal wiring line $20S_B$.

In this way, in the FPC 20A or 20B according to the first variation, the electrode pads of the ground wiring lines $20G_{A1}$ and $20G_{A2}$ are arranged at an angle, or the electrode pads of the ground wiring lines $20G_{B1}$ and $20G_{B2}$ are curved. The arrangement in the FPC 20A and 20B according to the first variation improves the solderability in the section from the FPC end to the end of the electrode pads of the ground wiring lines $20G_{A1}$ and $20G_{A2}$ or the section from the FPC end to the end of the electrode pads of the ground wiring lines $20G_{B1}$ and $20G_{B2}$ and therefore increases the ease of solder mounting.

In the exemplary FPC 20C illustrated in FIG. 5, multiple signal wiring lines $20S_{C1}$ and $20S_{C2}$ are arranged in parallel to each other and the electrode pads of ground wiring lines $20G_{C1}$ and $20G_{C3}$ are diverted at the end of the CPW 21C toward the signal wiring line $20S_{C1}$ and $20S_{C2}$, respectively, and then curved. Furthermore, in the exemplary FPC 20C, the electrode pad of the ground wiring line $20G_{C2}$ is separately divided at the end of the CPW21C toward the signal wiring lines $20S_{C1}$ and $20S_{C2}$, and then curved.

In the exemplary FPC 20C according to the first variation, the electrode pads of the ground wiring lines $20G_{C1}$, $20G_{C2}$ and $20G_{C3}$ are curved as in the FPC 20B illustrated in FIG. 4. The arrangement in the exemplary FPC 20C according to the first variation improves the solderability in the section from the FPC end to the ends of the electrode pads of the ground wiring lines $20G_{C1}$, $20G_{C2}$ and $20G_{C3}$ and therefore increases the ease of solder mounting. Furthermore, in the exemplary FPC 20C according to the first variation, the ground wiring line $20G_{C2}$ may be shared between the two signal wiring lines $20S_{C1}$ and $20S_{C2}$. Here, the width of the ground wiring line $20G_{C1}$, $20G_{C2}$ or $20G_{C3}$ may be wider than the width of the signal wiring line $20S_{C1}$ or $20S_{C2}$. If the ground wiring line $20G_{C1}$, $20G_{C2}$ or $20G_{C3}$ is wider, the diameter of through-holes in the electrode pad of the ground wiring line $20G_{C1}$, $20G_{C2}$ or $20G_{C3}$ may be greater than the diameter of through-holes in the electrode pad of the signal wiring line $20S_{C1}$ or $20S_{C2}$.

In a second variation, a portion of a signal wiring line S of MSL is covered with an insulating element in order to prevent formation of a solder bridge.

Figure 6:
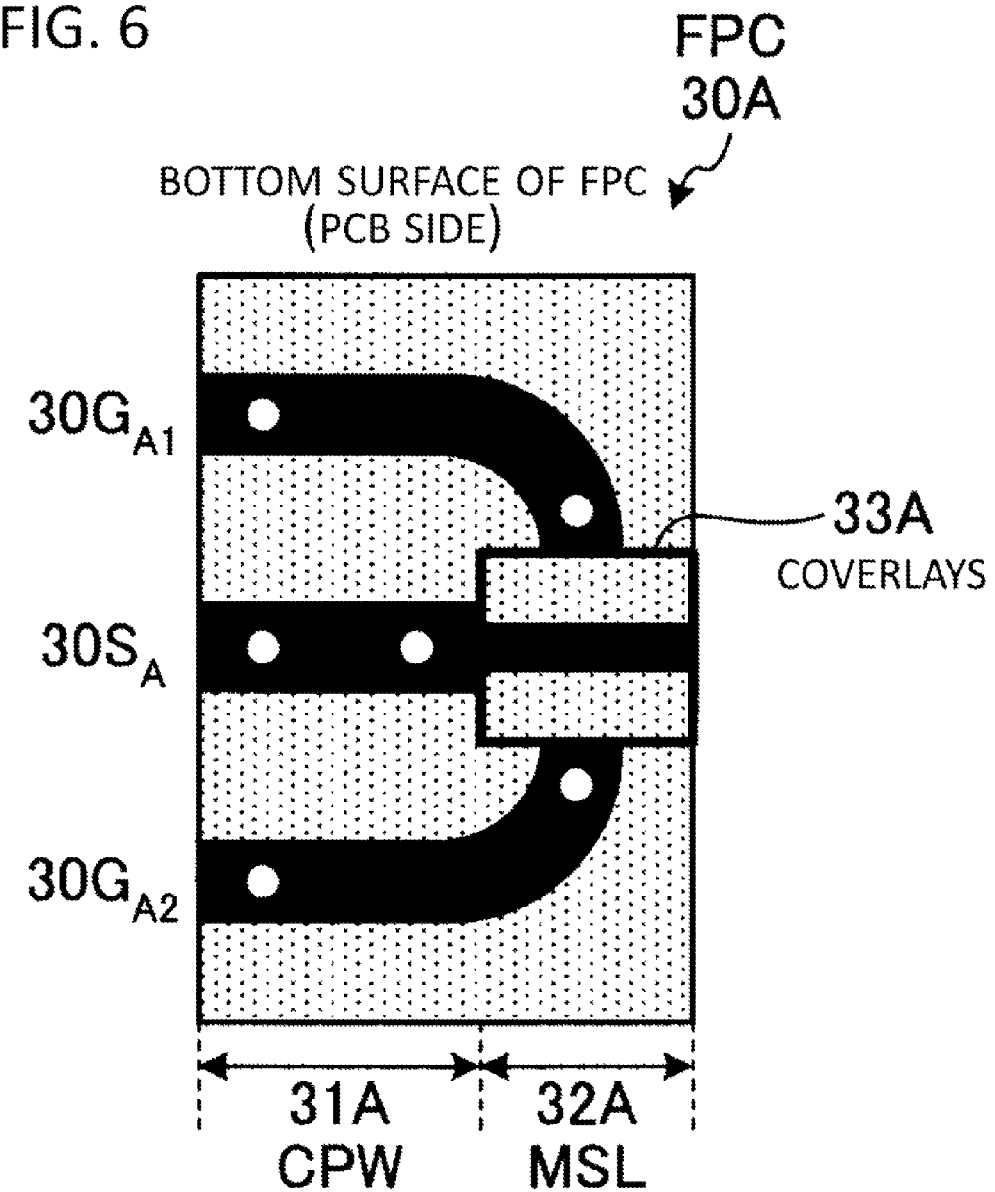
FIG. 6 is a diagram illustrating exemplary FPC according to a second variation.
Figure 7:
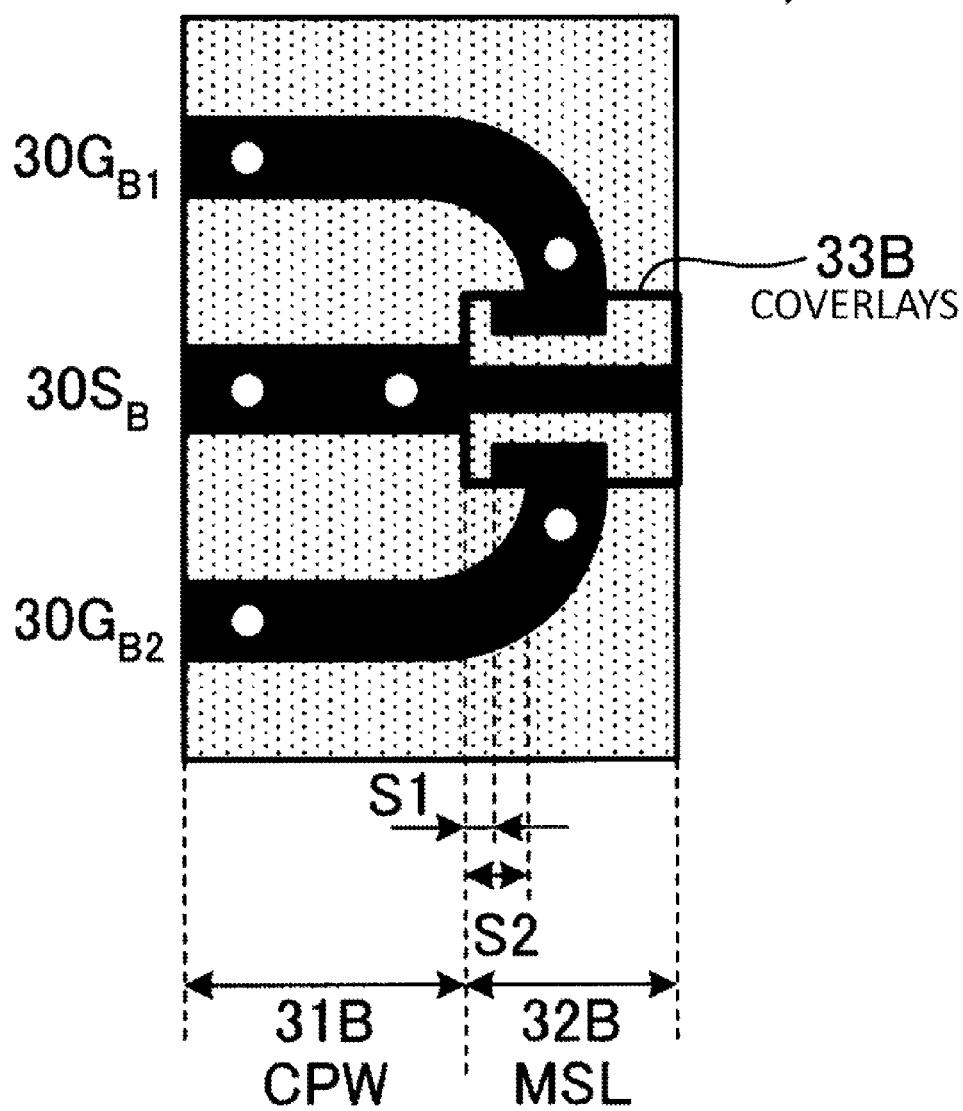
FIG. 7 is a diagram illustrating exemplary FPC according to the second variation.

FIGS. 6 and 7 illustrate exemplary FPC according to the second variation. In the exemplary FPC 30A in FIG. 6 and the exemplary FPC 30B in FIG. 7, a portion of each of signal wiring lines $30S_A$ and $30S_B$ of MSL 32A and 32B is covered with a coverlay 33A or 33B, which is an insulating element. The coverlays 33A and 33B may be made of polyimide, for example. While the coverlays 33A and 33B are rectangular in the examples in FIGS. 6 and 7, the coverlays 33A and 33B are not limited to the rectangular shape; coverlays of any shape may be used.

By covering a portion of the signal wiring lines $30S_A$ or $30S_B$ of the MSL 32A or MSL 32B with the coverlay 33A and 33B, respectively, the signal wiring lines $30S_A$ or $30S_B$ of the MSL 32A or 32B may be isolated. Accordingly, in the FPC 30A according to the second variation, formation of a solder bridge in the smaller spacing between the signal wiring line $30S_A$ and the ground wiring line $30G_{A1}$ or $30G_{A2}$ at the boundary with the CPW 31A in the MSL 32A may be prevented. Similarly, in the FPC 30B according to the second variation, formation of a solder bridge in the smaller spacing between the signal wiring line $30S_B$ and the ground wiring line $30G_{B1}$ or $30G_{B2}$ at the boundary with the CPW 31B in the MSL 32B may be prevented.

In the exemplary FPC 30A in FIG. 6 and the exemplary FPC 30B in FIG. 7, the coverlay 33A or 33B is disposed in such a manner that one side of the coverlay 33A or 33B is in contact with the end of the CPW 31A or 31B, that is, the position in which the width of the signal wiring line $30S_A$ or $30S_B$ changes. Accordingly, if the coverlay 33A or 33B changes the impedance, the non-linear change in impedance along the direction of the length of the FPC occurs only at the end of the CPW 31A or 31B. This facilitates the design of the FPC 30A and FPC 30B according to the second variation and PCB.

While the coverlay 33A covers a portion of only the signal wiring line $30S_A$ of the MSL 32A in the exemplary FPC 30A illustrated in FIG. 6, the disclosure is not limited to this. In one example, a portion of the electrode pad of the ground wiring line $30G_{B1}$ or $30G_{B2}$ that is closest to the signal wiring line $30S_B$ may be covered with the coverlay 33B as illustrated in FIG. 7. In another example, the electrode pad of the ground wiring line $30G_{B1}$ or $30G_{B2}$ may be formed so that the spacing between the electrode pad of the ground wiring line $30G_{B1}$ or $30G_{B2}$ and the electrode pad of the signal wiring line $30S_B$ becomes closer to spacing S2 from spacing S1 in the portion covered with the coverlay 33B as illustrated in FIG. 7. This enables fine adjustment of the impedance. That is, the impedance may be adjusted with a high degree of precision.

While the electrode pad of the ground wiring line $10G_1$ or $10G_2$ is extended from the end of the CPW 11 in the exemplary FPC 10 illustrated in FIG. 1, extending the electrode pad of a ground wiring line G increases the surface area of the electrode pad. In this case, the electrode pad of the ground wiring line G cools down more quickly during soldering in proportion to the surface area of the electrode pad, which may result in a cold solder joint. In a third variation, a method for reducing the surface area of the electrode pad of the ground wiring line G will be described.

Figure 8:
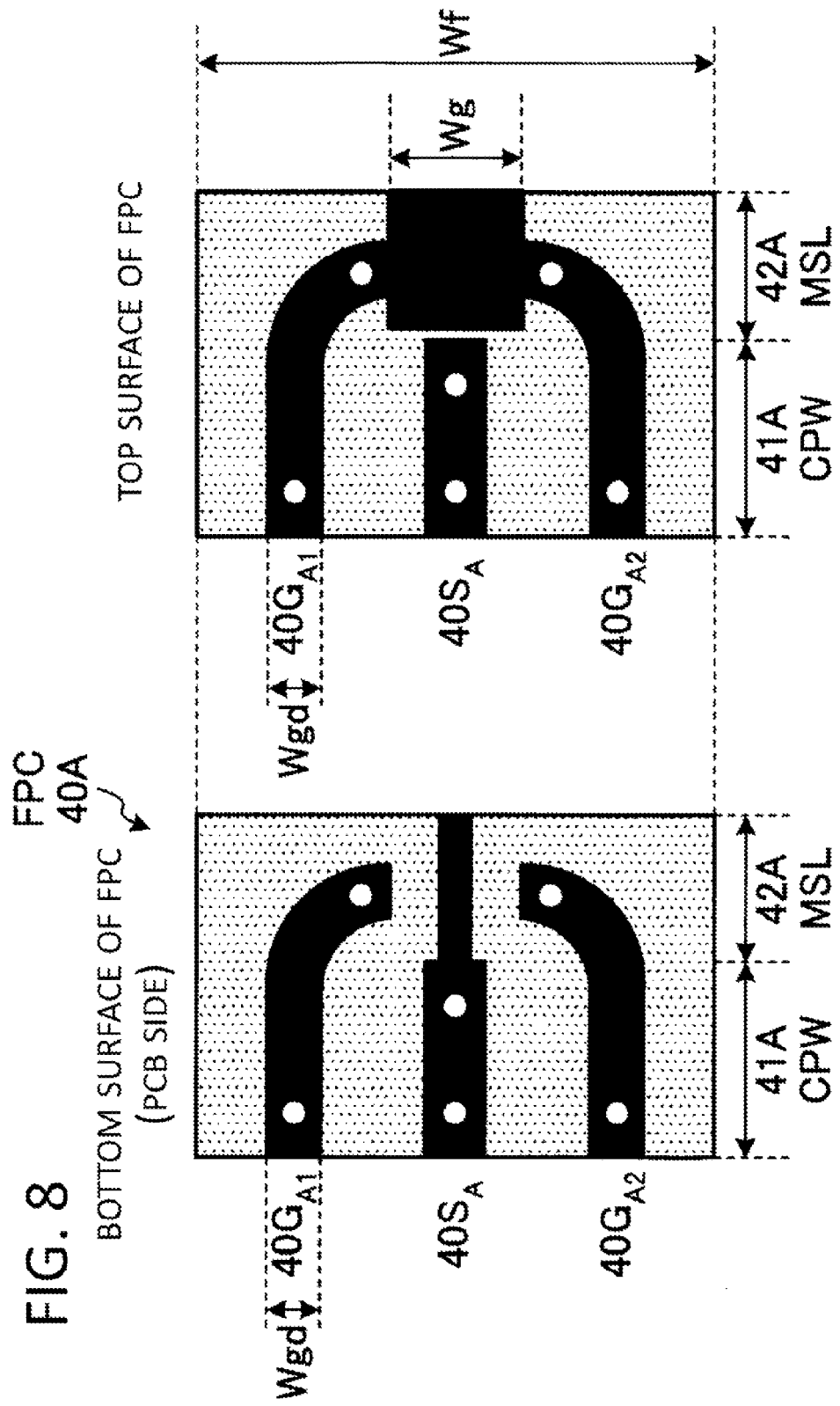
FIG. 8 is a diagram illustrating exemplary FPC according to a third variation.

FIG. 8 illustrates exemplary FPC according to the third variation. In the exemplary FPC 40A illustrated in FIG. 8, the width Wgd of ground wiring lines $40G_{A1}$ and $40G_{A2}$ of CPW 41A formed on the bottom surface of the FPC 40A is wider than the width Wgu of ground wiring lines $40G_{A1}$ and $40G_{A2}$ of CPW 41A formed on the top surface of the EPCs 40A. In the exemplary FPC 40A illustrated in FIG. 8, the width Wg of a ground wiring line of an MSL 42A is narrower than the width Wf of FPC 40.

The top surface of the FPC 40A, which is exposed to the atmosphere, contributes more to heat dissipation of the electrode pads than the bottom surface of the FPC 40A coupled to a PCB. Therefore, in the FPC 40A according to the third variation, the surface area of the electrode pads of ground wiring lines G formed on the top surface of the FPC 40A is made smaller to make the electrode pads slow to cool during soldering, thereby increasing the ease of solder mounting.

If the width Wg of the ground wiring line of the MSL is too narrow, the impedance may change. Therefore, preferably reduction of the width Wg of the ground wiring line of the MSL is controlled so that the impedance will not unacceptably change.

Figure 9:
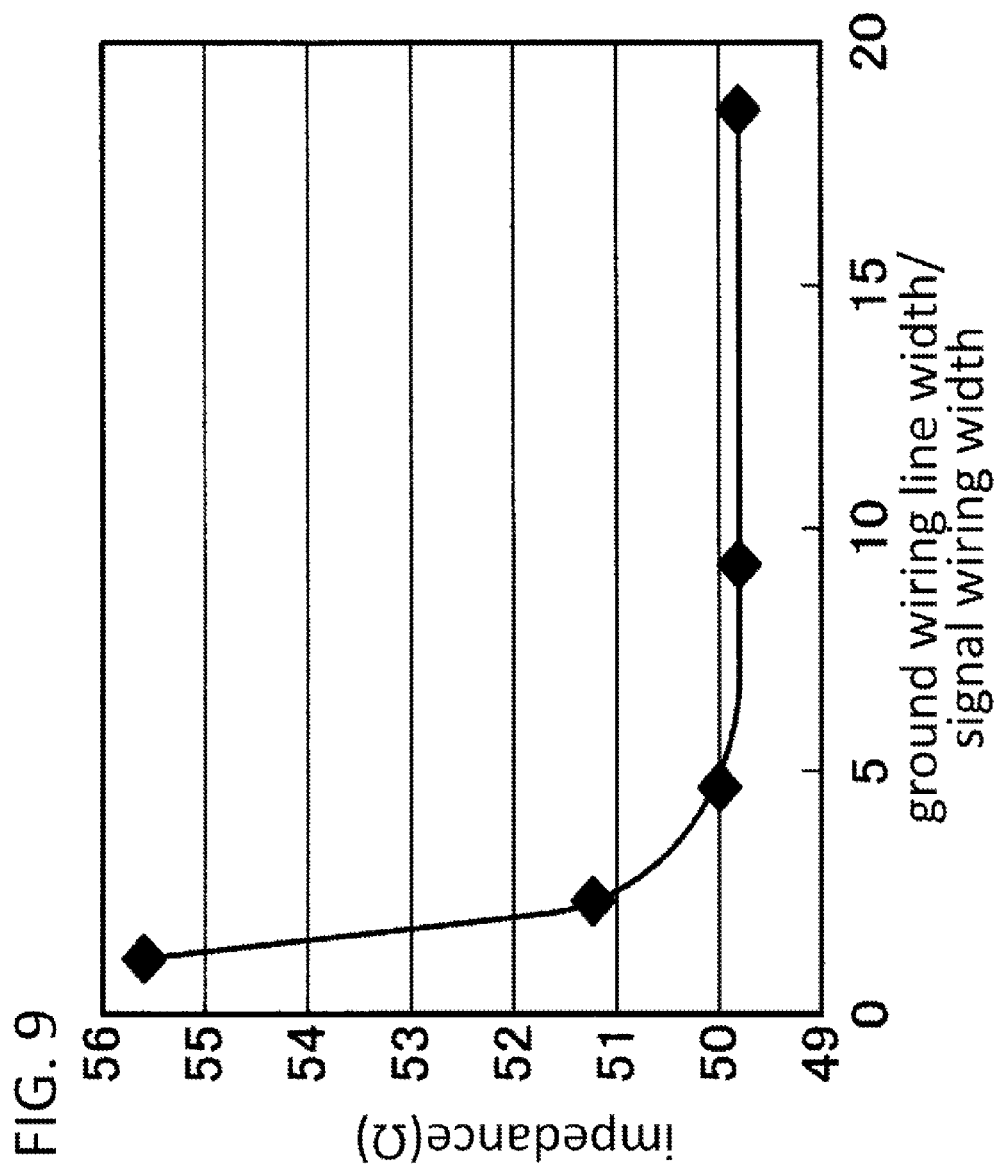
FIG. 9 is a graph of the relationship between the ratio of the width of a ground wiring line G to the width of a signal wiring line S and impedance.

FIG. 9 is a graph of the relationship between the ratio of ground wiring line G width to signal wiring line S width and impedance. The horizontal axis of the graph in FIG. 9 represents the ratio of ground wiring line G width to signal wiring line S width. The vertical axis of the graph in FIG. 9 represents impedance (S2). As may be seen from FIG. 9, when the width Wg of the ground wiring line of the MSL is four or more times the width of the signal wiring line S, the impedance is stable at around 50Ω. When the width Wg of the ground wiring line G of the MSL is less than four times the width of the signal wiring line S, the impedance steeply increases from 50Ω. Therefore, a reduction of width Wg of the ground wiring line of the MSL is controlled so that the width Wg of the ground wiring line G of the MSL is four or more times the width of the signal wiring line S, thereby impedance mismatch may be avoided while increasing the ease of solder mounting.

A reduction of the width Wg of the ground wiring line G of the MSL may lead to poor grounding of the electrode pad of the ground wiring line G of the MSL. Therefore, if the width of the ground wiring line of the MSL is reduced, preferably the electrode pad of the ground wiring line G of the MSL has a shape that is stably grounded to the surface of the FPC.

Figure 10:
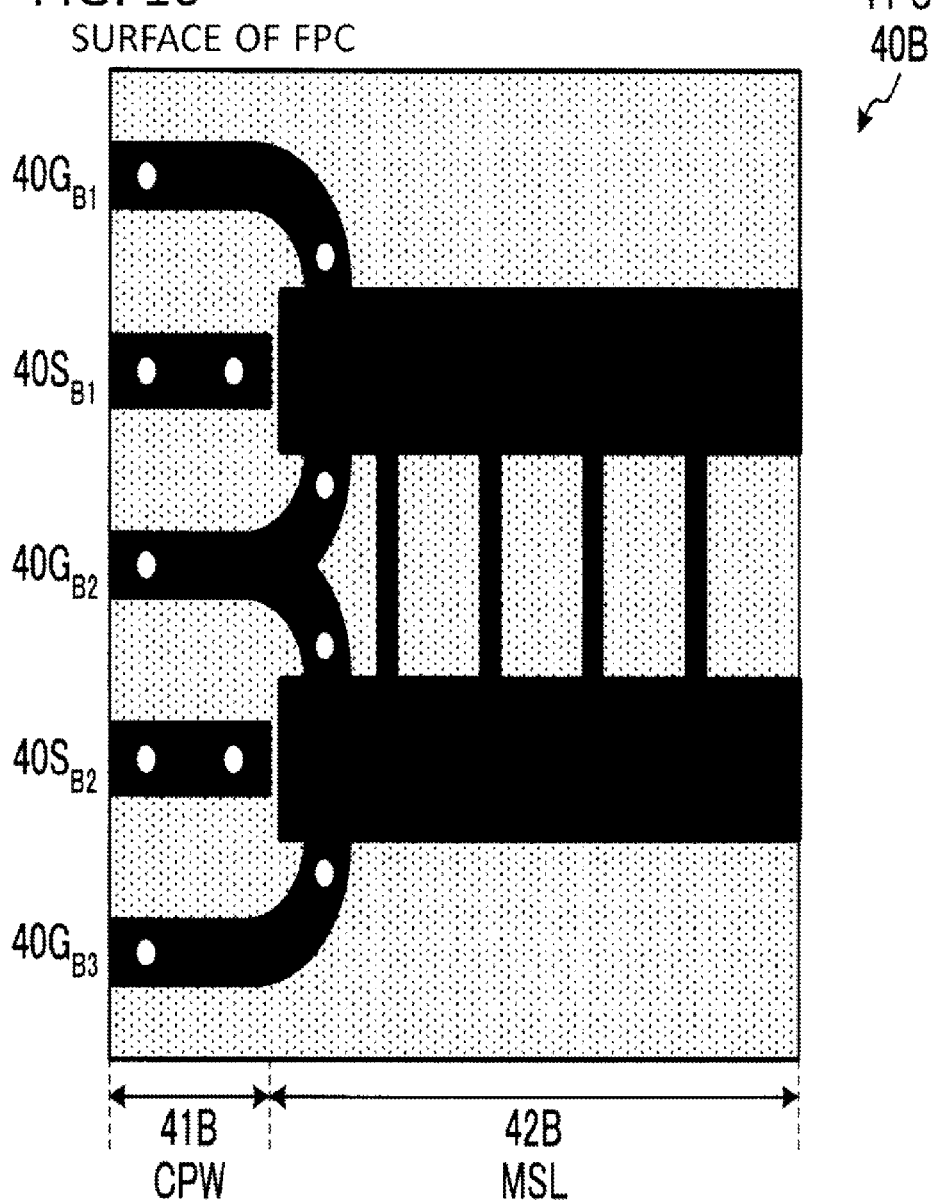
FIG. 10 is a diagram illustrating exemplary FPC according to the third variation.

FIG. 10 illustrates exemplary FPC according to the third variation. In the FPC 40B illustrated in FIG. 10, the electrode pad of a ground wiring line G of the MSL 42B is formed into the shape of a series of vertically stacked letters H, that is, the shape of a ladder. The ladder shape of the electrode pad of the ground wiring line G of the MSL 42B may prevent poor grounding because a wider area of the electrode pad of the ground wiring line G may be coupled to the surface of the FPC 40B.

In a fourth variation, a cutout or hole is formed in the electrode pad of a ground wiring line G at or near an FPC end in order to facilitate the flow of solder from the FPC end to the end of the electrode pad of the ground wiring line G.

Figure 11:
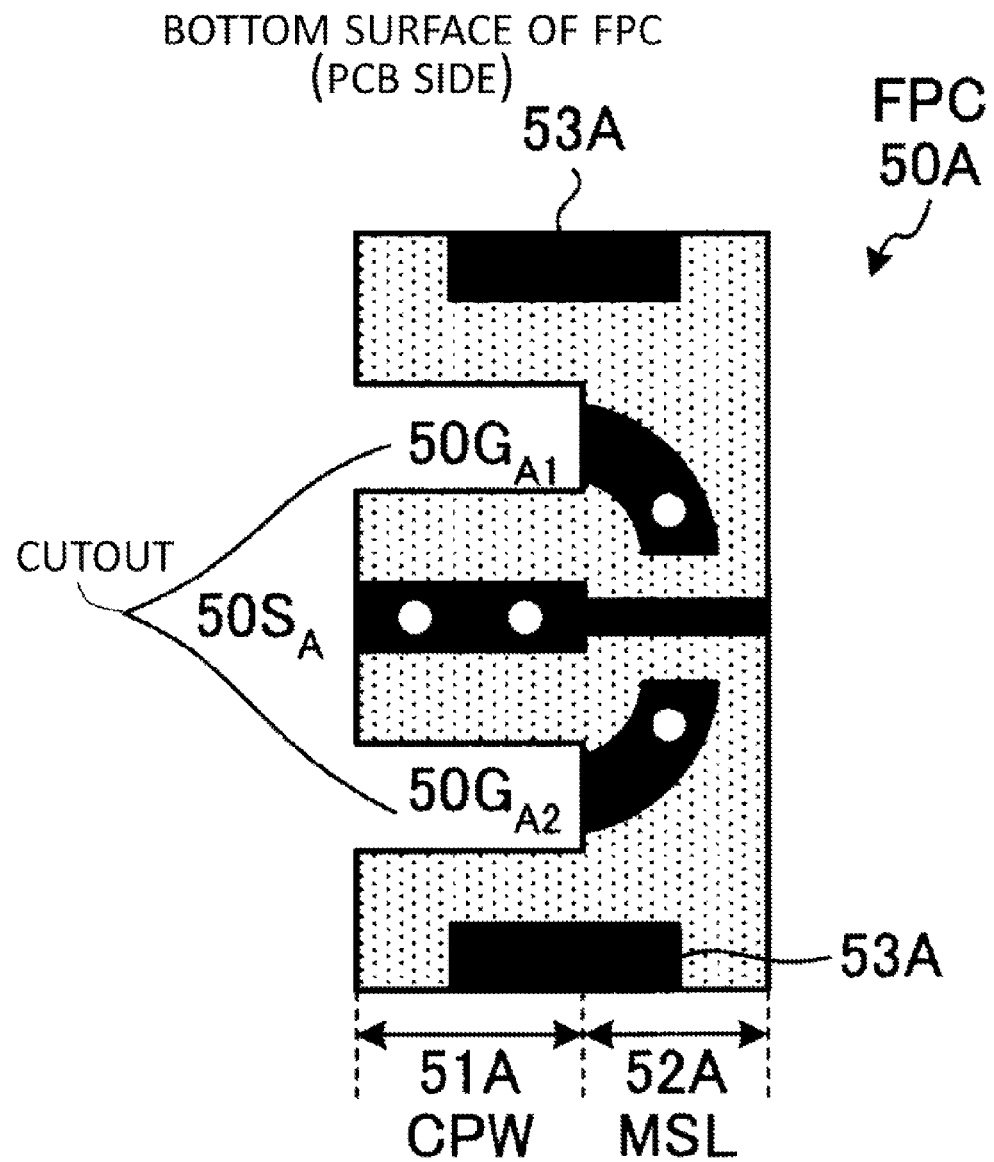
FIG. 11 is a diagram illustrating exemplary FPC according to a fourth variation.
Figure 12:
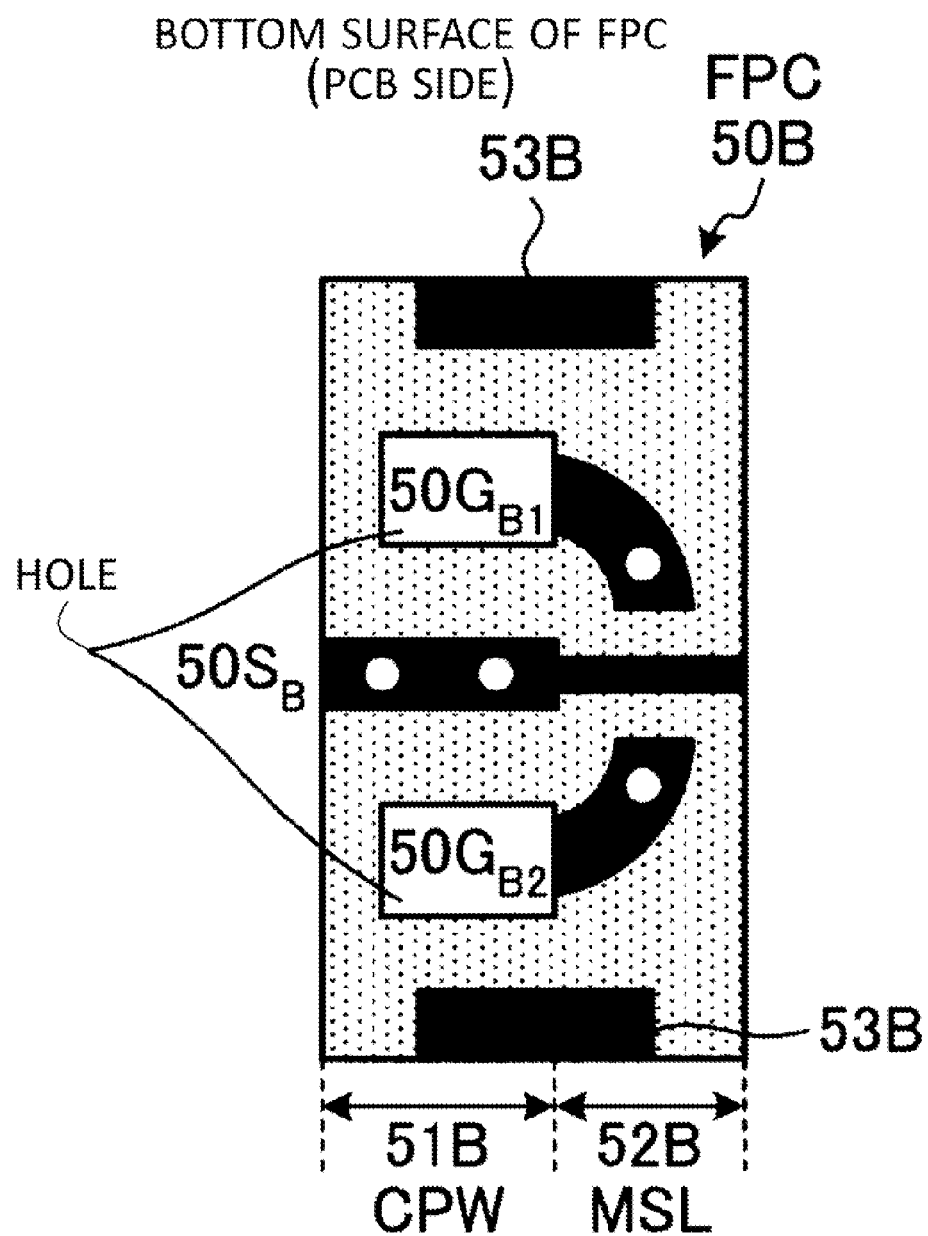
FIG. 12 is a diagram illustrating exemplary FPC according to the fourth variation.

FIGS. 11 and 12 illustrate exemplary FPC according to the fourth variation. In the exemplary FPC 50A illustrated in FIG. 11, a cutout is formed in each of the electrode pads of ground wiring lines $50G_{A1}$ and $50G_{B1}$ from the FPC end to the end of CPW 51A, that is, the position where the width of the signal wiring line $50S_A$ changes. In the exemplary FPC 50B illustrated in FIG. 12, a hole is formed in a predetermined section of the electrode pad of each of the ground wiring lines $50G_{B1}$ and $50G_{B2}$ between the end of CPW 51B and the FPC end. Since the cutouts or holes are formed in the electrode pads of ground wiring lines G of the CPW 51 in this way, soldering to the ends of the electrode pads of the ground wiring lines G may be more easily performed through the cutouts or holes.

However, cutouts or holes formed in FPC reduce the joint area in the electrode pads of the ground wiring lines G. Accordingly, the fixing strength may become inadequate and the FPC may peel off easily from the PCB. In the exemplary FPC 50A illustrated in FIG. 11 and the exemplary FPC 50B illustrated in FIG. 12, reinforcing land 53A or 53B is provided separately from the electrode pads at the FPC end. The reinforcing land 53A or 53B reinforces the fixing strength of the electrode pads of the ground wiring lines G.

While exemplary modifications to the shape of electrodes of FPC have been described above, the disclosure is not limited to the modifications. In a fifth variation, various modifications to the shape of electrodes of PCB will be described.

Figure 13:
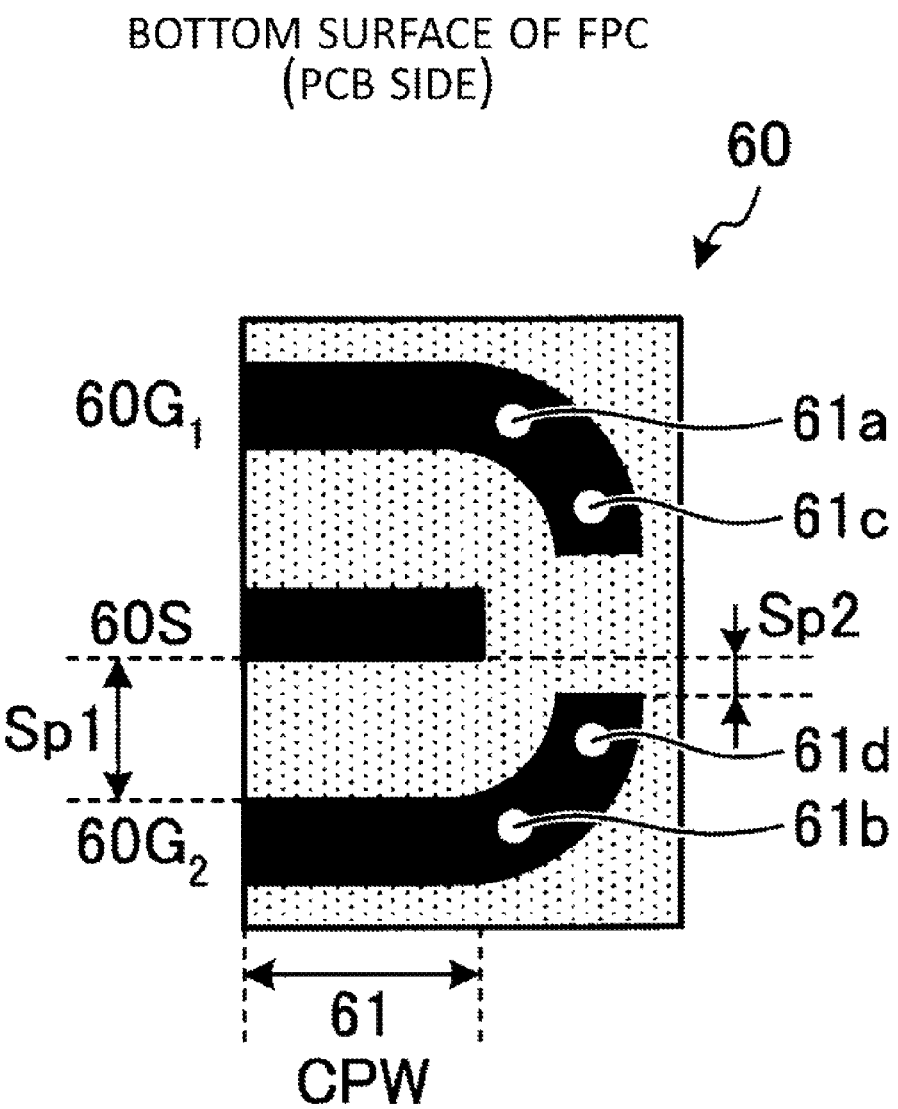
FIG. 13 is a diagram illustrating exemplary FPC according to a fifth variation.

FIG. 13 illustrates an exemplary PCB according to the fifth variation. In the exemplary PCB 60 illustrated in FIG. 13, an MSL is formed in such a manner that the spacing Sp2 between a signal wiring line 60S and each of ground wiring lines $60G_1$ and $60G_2$ extended from an end of CPW is smaller than the spacing Sp1 between the signal wiring line 60S and each of the ground wiring lines $60G_1$ and $60G_2$ in the CPW 61 as in the FPC 10 illustrated in FIG. 1. In the exemplary PCB 60 illustrated in FIG. 13, vias 61a to 61d that conductively interconnect the top and bottom surfaces of are formed in a portion of the electrode pad of each of the ground wiring lines $60G_1$ and $60G_2$ on the PCB 60 where the spacing between the signal wiring line 60S and the ground wiring lines $60G_1$ and $60G_2$ is smaller. In the exemplary PCB 60 illustrated in FIG. 13, the portion of the electrode pad of the ground wiring line G on the PCB 60 where the spacing between the signal wiring line S and the ground wiring line G is smaller is formed so that the portion substantially coincide with a portion of the electrode of a ground wiring line G of FPC where the spacing between a signal wiring line S and a ground wiring line G is smaller.

Since the shapes of the electrodes on the PCB 60 according to the fifth variation match the electrodes on the FPC, the impedance may be adjusted with a higher degree of precision and the ease of solder mounting is improved.

While through-holes are formed in the electrode pads of the signal wiring line 10S and the ground wiring lines $10G_1$ and $10G_2$ in the exemplary FPC 10 illustrated in FIG. 1, cutouts may be formed in the electrode pads of a signal wiring line S and ground wiring lines G instead of the through-holes.

Figure 14:
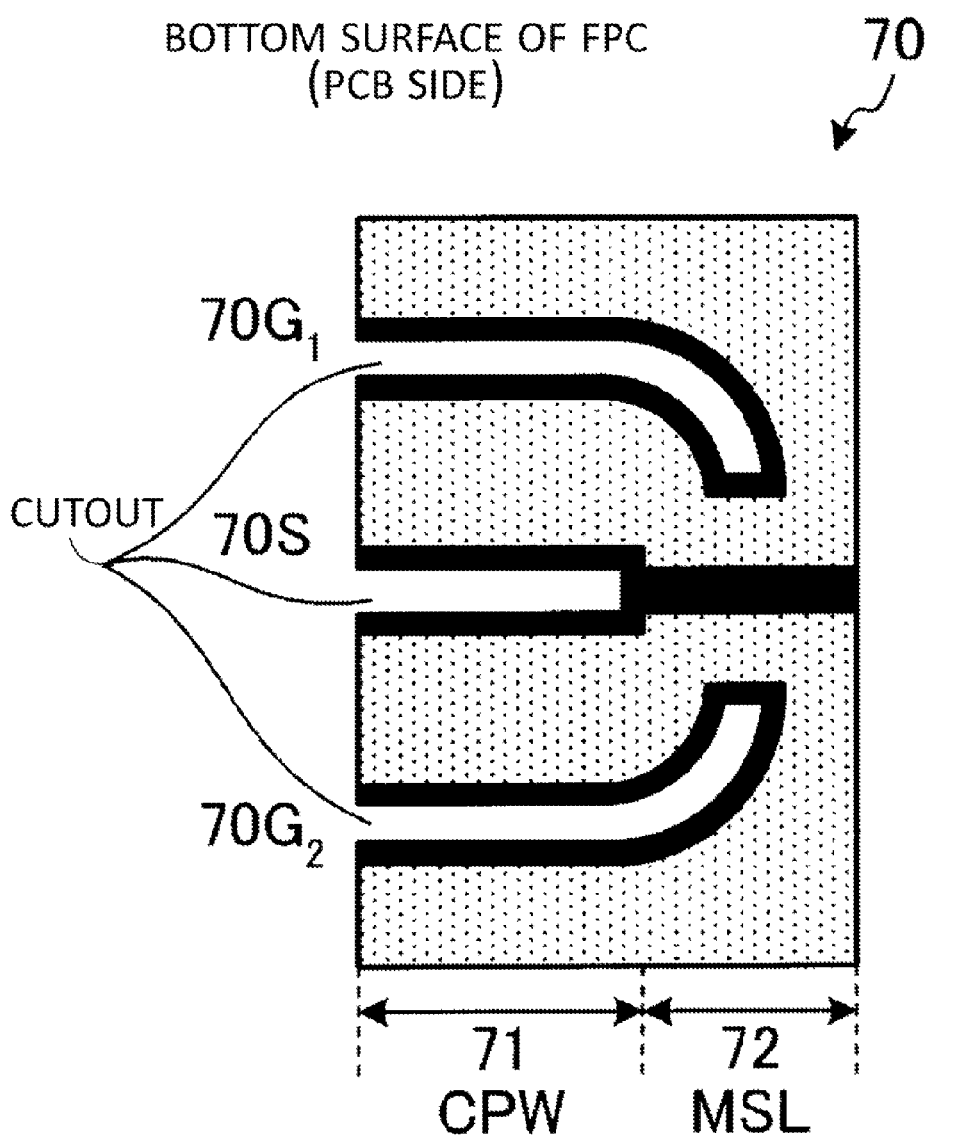
FIG. 14 is a diagram illustrating exemplary FPC according to a sixth variation.

FIG. 14 illustrates exemplary FPC according to the sixth variation. In the exemplary FPC 70 illustrated in FIG. 14, the core portion of each of the electrode pads of a signal wiring line 70S and ground wiring lines $70G_1$ and $70G_2$ is cut off over the length from the FPC end to the end of CPW 71 to form a cutout. The cutout formed in each electrode pad in this way allows the solder joint to be readily inspected and also facilitates soldering to the end of the electrode pad.

In a seventh variation, a solder resist is applied to a portion of a signal wiring line S of a PCB in order to prevent formation of a solder bridge.

Figure 15:
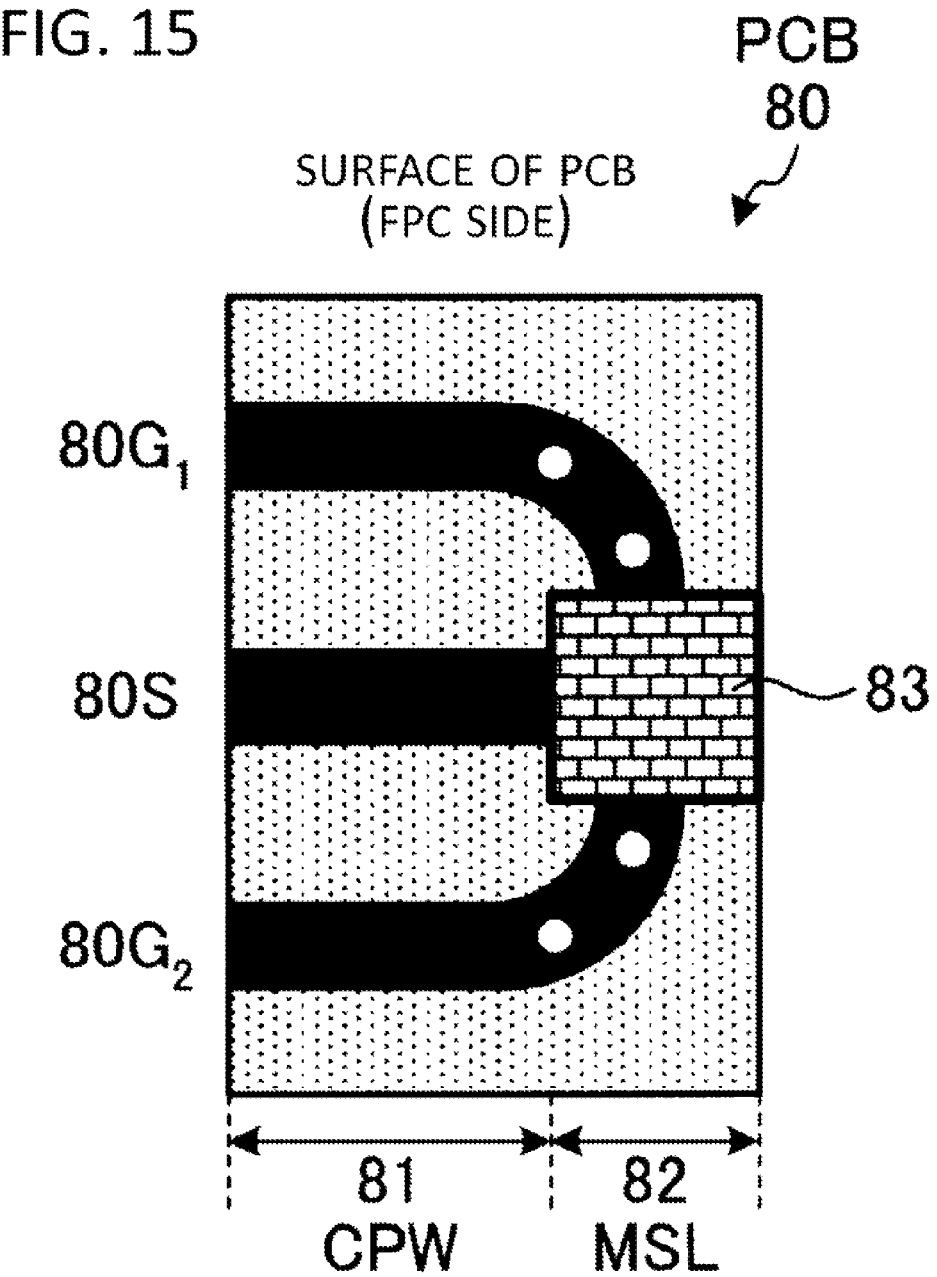
FIG. 15 is a diagram illustrating exemplary FPC according to a seventh variation.

FIG. 15 illustrates an exemplary PCB according to the seventh variation. In the exemplary PCB 80 illustrated in FIG. 15, a solder resist 83 is applied to a portion of an electrode pad of a signal wiring line 80S on the PCB 80 where the spacing between the signal wiring line 80S and the ground wiring lines $80G_1$ and $80G_2$ is smaller. While the solder resist 83 is rectangular in the example in FIG. 15, the solder resist 83 is not limited to the shape illustrated but may be applied in any shape. Application of the solder resist 83 to a portion of the signal wiring line 80S on the PCB 80 may isolate a signal wiring line 10S of an MSL 12 on FPC. Accordingly, in the PCB 80 according to the seventh variation, formation of a solder bridge in the small spacing between the signal wiring line 10S and the ground wiring lines $10G_1$ and $10G_2$ at the boundary with CPW 11 on the MSL 12 may be prevented.

The use of FPC to surface-mount an optical module to the PCB of an optical transmitter has been described in the embodiment. An optical transmitter in which an optical module is surface-mounted will be described below.

Figure 16:
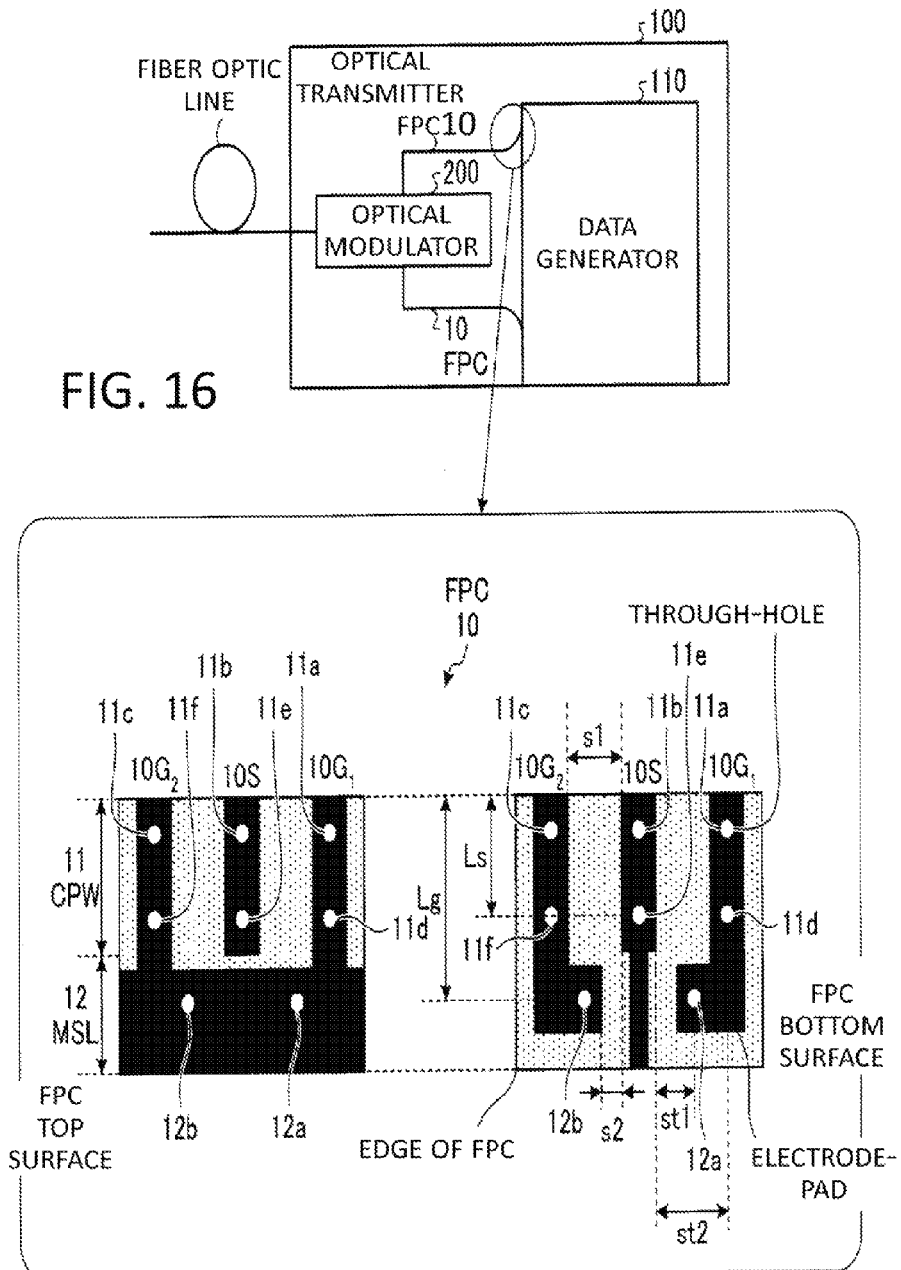
FIG. 16 is a block diagram illustrating a configuration of an optical transmitter according to an embodiment.
Figure 17:
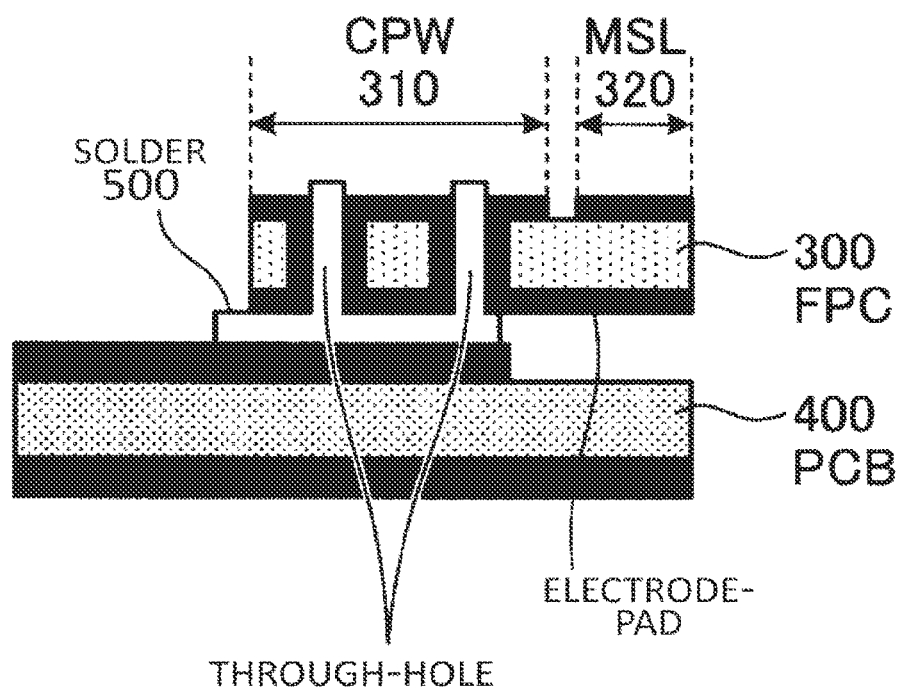
FIG. 17 is a cross-sectional view of connection sections of a PCB and FPC viewed from a side.
Figure 18:
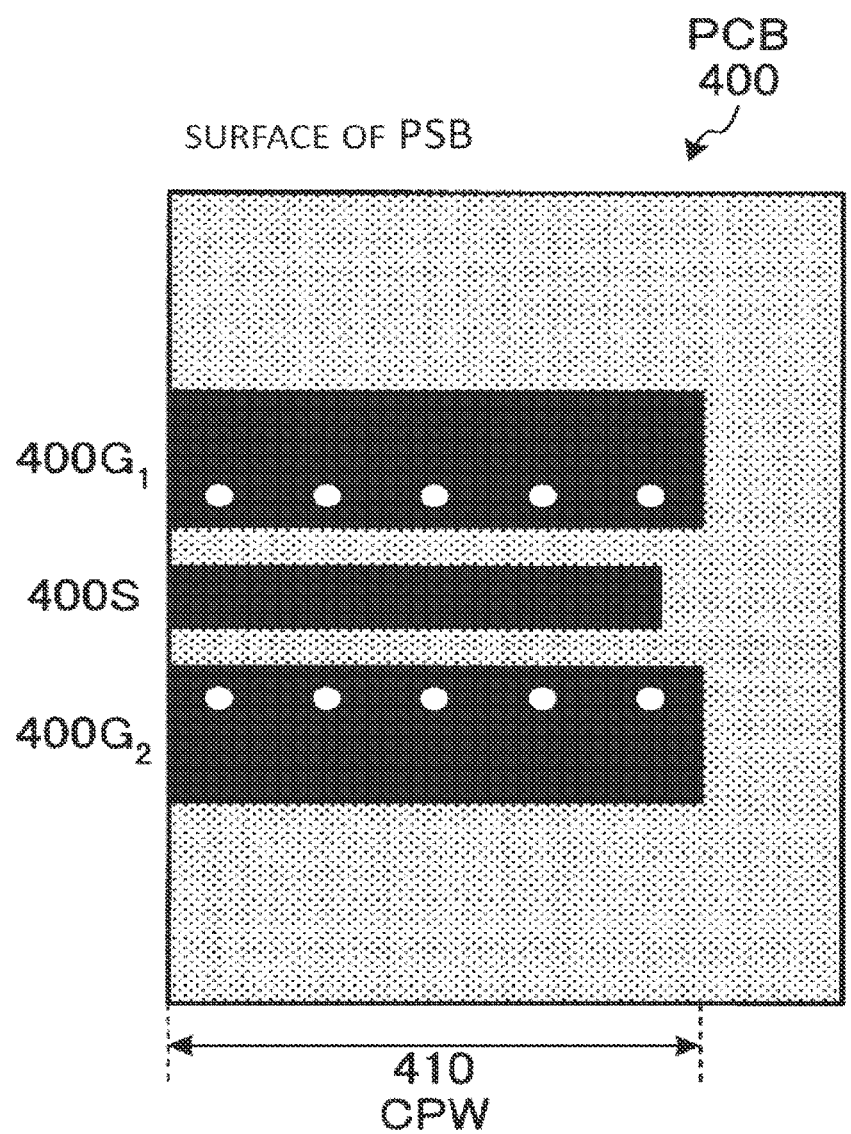
FIG. 18 is a diagram illustrating the connection surface of the PCB to be coupled to the FPC.
Figure 19:
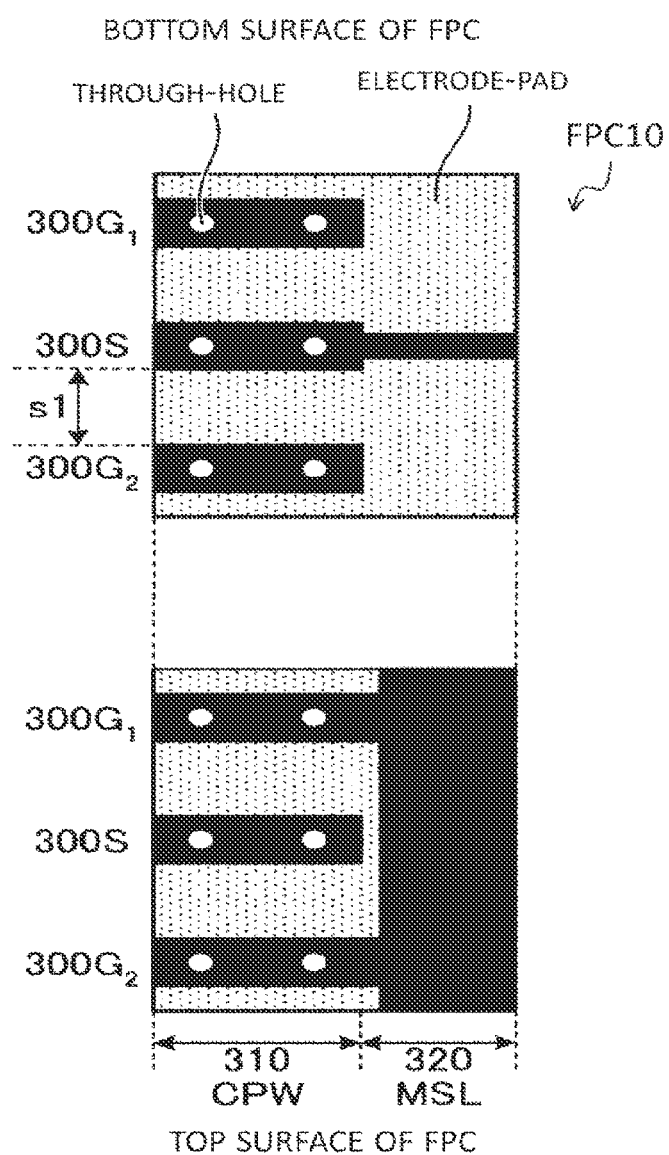
FIG. 19 is a diagram illustrating the connection surface of the FPC to be coupled to the PCB.

FIG. 16 is a block diagram illustrating a configuration of an optical transmitter according to an embodiment. As illustrated in FIG. 16, the optical transmitter 100 includes a data generator 110, an optical module 200, and FPC 10. The data generator 110 is coupled to an external device, not depicted, through a fiber optic line. While FPC 10 has been described as an example of the interconnecting circuit board, the interconnecting circuit board may be other wiring board such as printed circuit board, a glass substrate, or a ceramic substrate.

The data generator 110 is a processor that generates data to be output to the optical module 200. One mode of the data generator 110 may be an electronic circuit such as a Central Processing Unit (CPU) or a Micro Processing Unit (MPU). Another mode may be an integrated circuit such as an Application Specific Integrated Circuit (ASIC) or a Field Programmable Gate Array (FPGA).

The optical module 200 is a phase-modulation optical modulator. One example of the optical module 200 is a Mach-Zehnder optical modulator. For example, the optical module 200 converts electrical data signal generated by the data generator 110 to an optical signal and outputs the optical signal onto the fiber optic line.

The data generator 110 and the optical module 200 are conductively interconnected through FPC 10 having improved reflection characteristics for an electrical signal input from the data generator 110 into the FPC 10. Accordingly, in the optical transmitter 100 according to the present embodiment, reflections of an input signal in the FPC are reduced to minimize errors in data to be transmitted to a destination optical receiver.

While solder joints are used to conductively interconnect the FPC and PCB in the embodiments described above, the disclosure is not limited to this. For example, an electrically conductive adhesive, instead of solder, may be used to conductively interconnect the FPC and the PCB.

While the MSL is formed on the bottom surface of the FPC 10 in the embodiments described above, the disclosure is not limited to this. For example, the MSL may be formed on the top surface of the FPC 10. Furthermore, the spacing between a signal wiring line S and a ground wiring line G on the same surface on which signal electrodes are formed or the other surface of the FPC 1 may be made smaller.

While preferred embodiments of the present invention have been described, the present invention is not limited to any specific embodiments and various changes and modification may be made to the embodiments. For example, the interconnecting circuit board of the present invention may be also used not only for optical transmitters but also for general semiconductor devices such as semiconductor packages and semiconductor modules, mobile phones, digital sill cameras, transmission apparatuses such as routers, and switches, and electronic devices such as computers and servers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical transmitter comprising,
   an optical module;
   a printed circuit board; and
   an interconnecting circuit board configured to be electrically coupled, at one end of the interconnecting circuit board, to the optical module; and the interconnecting circuit board configured to be soldered and electrically coupled, at an other end of the interconnecting circuit board, to the printed circuit board in a surface-to-surface fashion;

wherein the interconnecting circuit board comprises, on a bottom surface of the interconnecting circuit board to which the printed circuit board is coupled:

a coplanar waveguide having a first end reaching an edge of the one end of the interconnecting circuit board; and a microstrip line including a signal wiring line and a ground wiring line, the signal wiring line of the microstrip line being extended from a second end of the coplanar waveguide, wherein the width of the signal wiring line of the microstrip line is narrower than the width of a signal wiring line of the coplanar waveguide, and the spacing between the signal wiring line extended from the second end of the coplanar waveguide and the ground wiring line is smaller than the spacing between the signal wiring line of the coplanar waveguide and the ground wiring line, and wherein the interconnecting circuit board further comprises, on a top surface of the interconnecting circuit board opposite to the bottom surface, a signal wiring line at a position corresponding to the signal line of the coplanar waveguide on the bottom surface, having a substantially same width as the signal wiring line of the coplanar waveguide, and wherein the interconnecting circuit board further comprises one or more through holes electrically connecting the signal wiring line of the coplanar waveguide on the bottom surface and the signal wiring line on the top surface.

2. The optical transmitter according to claim 1, wherein a portion of the signal wiring line of the microstrip line is covered with an insulating element.

3. The optical transmitter according to claim 1, wherein the width of the ground wiring line of the coplanar waveguide is wider than the width of a ground wiring line of a coplanar waveguide formed on the surface opposite from the surface to be electrically coupled to the printed circuit board.

4. The optical transmitter according to claim 1, wherein the width of the ground wiring line of the microstrip line is narrower than the width of the interconnecting circuit board.

5. The optical transmitter according to claim 1, further comprising a through-hole provided in an electrode pad of the ground wiring line of the microstrip line.

6. The optical transmitter according to claim 5, wherein a portion of the signal wiring line of the microstrip line is covered with an insulating element.

7. An interconnecting circuit board, to be electrically connected to an optical module at one end of the interconnecting circuit board and to be soldered and electrically connected to a printed circuit board at an other end of the interconnecting circuit board in a surface-to-surface fashion, comprising on a bottom surface of the interconnecting circuit board to which the printed circuit board is coupled:

a coplanar waveguide having a first end reaching an edge of the interconnecting circuit board; and a microstrip line including a signal wiring line and a ground wiring line, the signal wiring line of the microstrip line being extended from a second end of the coplanar waveguide, wherein the width of the signal wiring line of the microstrip line is narrower than the width of a signal wiring line of the coplanar waveguide, and the spacing between the signal wiring line extended from the second end of the coplanar waveguide and the ground wiring line is smaller than the spacing between the signal wiring line of the coplanar waveguide and the ground wiring line, wherein the interconnecting circuit board further comprises, on a top surface of the interconnecting circuit board opposite to the bottom surface, a signal wiring line at a position corresponding to the signal line of the coplanar waveguide on the bottom surface, and having a substantially same width as the signal wiring line of the coplanar waveguide, and wherein the interconnecting circuit board further comprises one or more through holes electrically connecting the signal wiring line of the coplanar waveguide on the bottom surface and the signal wiring line on the top surface.

* * * * *